(12) United States Patent
Jackson (10) Patent No.: US 10,744,527 B2
(45) Date of Patent: Aug. 18, 2020

(54) LOW TORQUE SPRINKLER FITTING AND METHOD OF MANUFACTURE

(71) Applicant: Viking Group, Inc., Grand Rapids, MI (US)

(72) Inventor: Eldon Douglas Jackson, Three Rivers, MI (US)

(73) Assignee: Viking Group, Inc., Caledonia, MI (US)

( * ) Notice: Subject to any disclaimer, the term of this patent is extended or adjusted under 35 U.S.C. 154(b) by 320 days.

(21) Appl. No.: 15/664,311

(22) Filed: Jul. 31, 2017

(65) Prior Publication Data

US 2018/0056318 A1 Mar. 1, 2018

Related U.S. Application Data

(60) Provisional application No. 62/378,338, filed on Aug. 23, 2016.

(51) Int. Cl.
*B05B 15/65* (2018.01)
*F16L 47/24* (2006.01)
(Continued)

(52) U.S. Cl.
CPC .............. *B05B 15/65* (2018.02); *A62C 35/68* (2013.01); *B29C 70/72* (2013.01); *F16J 15/022* (2013.01);
(Continued)

(58) Field of Classification Search
CPC ....... A62C 35/68; B05B 15/65; F16L 15/008; F16L 15/003; F16L 47/24; F16J 15/022
(Continued)

(56) References Cited

U.S. PATENT DOCUMENTS

| 519,568 A | 5/1894 | Cooney |
| 1,233,644 A | 7/1917 | Clark |

(Continued)

FOREIGN PATENT DOCUMENTS

| DE | 4129853 C1 | 11/1992 |
| DE | 29606026 | 8/1996 |

(Continued)

OTHER PUBLICATIONS

European Patent Office, European Patent Application No. 17844274. 5, Extended European Search Report dated Feb. 3, 2020; 26 pages.

(Continued)

*Primary Examiner* — Zachary T Dragicevich
(74) *Attorney, Agent, or Firm* — Perkins Coie LLP (57) ABSTRACT

A brass fitting is in-molded in a plastic pipe fitting, which is coupled to a water supply line in a conventional matter. The brass insert receives a tapered seal with sealing surfaces that seat against the brass insert and a sprinkler head to form a sealed connection. The seal includes a tapered passageway for compression when tightening, as well as an external taper to allow the seal to conform to the socket formed by the plastic pipe fitting and brass insert. Also, a manufacturing method includes in-molding a brass insert within a plastic fitting using an O-ring which interfaces between the brass insert and surrounding molded fitting to seal the brass insert to the fitting. In one embodiment, the seal is used in a polymeric fitting without a brass insert.

29 Claims, 7 Drawing Sheets

(51) Int. Cl.
*F16J 15/02* (2006.01)
*A62C 35/68* (2006.01)
*B29C 70/72* (2006.01)
*B29K 705/00* (2006.01)
*B29C 70/68* (2006.01)
*B29K 27/06* (2006.01)
*B29L 1/00* (2006.01)
*B29L 31/26* (2006.01)

(52) U.S. Cl.
CPC ............ *F16L 47/24* (2013.01); *B29C 70/682* (2013.01); *B29C 70/683* (2013.01); *B29K 2027/06* (2013.01); *B29K 2705/00* (2013.01); *B29L 2001/00* (2013.01); *B29L 2031/26* (2013.01)

(58) Field of Classification Search
USPC ....... 285/95, 110, 111, 112, 332.3, 355, 910, 285/918; 277/626, 644
See application file for complete search history.

(56) References Cited

U.S. PATENT DOCUMENTS

| | | |
|---|---|---|
| 1,368,196 A | 2/1921 | Peck |
| 1,681,470 A | 8/1928 | Drees |
| 1,941,174 A | 12/1933 | Jensen |
| 2,110,127 A | 3/1938 | Hinderliter |
| 2,374,138 A | 4/1945 | Sanford |
| 2,399,275 A | 4/1946 | Wenk |
| 2,712,457 A | 7/1955 | Kimbro |
| 2,968,440 A | 1/1961 | Cone |
| 3,100,656 A | 8/1963 | MacArthur |
| 3,342,501 A | 9/1967 | Meyer |
| 3,472,534 A | 10/1969 | Stevens |
| 3,489,441 A | 1/1970 | Malcolm |
| 3,720,420 A | 3/1973 | Jelinek et al. |
| 3,971,579 A | 7/1976 | Brown |
| 4,056,272 A | 11/1977 | Morrill |
| 4,073,513 A | 2/1978 | Blakeley |
| 4,296,954 A | 10/1981 | Fujimaki et al. |
| 4,398,754 A | 8/1983 | Caroleo et al. |
| 4,529,211 A * | 7/1985 | Rodgers ......................... 277/626 |
| 4,570,983 A | 2/1986 | Olenfalk et al. |
| 4,629,217 A * | 12/1986 | Straub ..................... F16L 47/12 285/112 |
| 4,634,154 A | 1/1987 | Arora et al. |
| 4,682,797 A | 7/1987 | Hildner |
| 4,905,766 A | 3/1990 | Dietz et al. |
| 4,938,292 A | 7/1990 | Johnson |
| 5,109,929 A | 5/1992 | Spears |
| 5,149,144 A | 9/1992 | Blakeley |
| 5,286,001 A | 2/1994 | Rafeld |
| 5,390,965 A | 2/1995 | Few |
| 5,437,481 A * | 8/1995 | Spears .................... F16L 47/24 |
| 5,582,439 A | 12/1996 | Spears |
| 5,775,378 A | 7/1998 | Auvil et al. |
| 6,039,120 A | 3/2000 | Wilkins et al. |
| 6,540,261 B1 | 4/2003 | Painter et al. |
| 6,565,124 B2 | 5/2003 | Mosse |
| 6,866,305 B2 | 3/2005 | Spears |
| 6,959,880 B2 | 11/2005 | Swigley |
| 6,991,268 B2 | 1/2006 | Spears |
| 7,055,865 B2 | 6/2006 | Riordan, III et al. |
| 7,426,784 B2 | 9/2008 | Spears et al. |
| 7,458,613 B2 | 12/2008 | Spears |
| 7,597,363 B2 | 10/2009 | Hikmat et al. |
| 8,297,663 B2 | 10/2012 | Spears |
| 8,403,372 B2 | 3/2013 | Hikmat et al. |
| 8,459,370 B2 | 6/2013 | Orr et al. |
| 8,474,472 B2 | 7/2013 | Spears |
| 9,709,202 B2 | 7/2017 | Spears |
| 2002/0185282 A1 | 12/2002 | Kretschmer |
| 2003/0000694 A1 | 1/2003 | Sweeney et al. |
| 2008/0012327 A1* | 1/2008 | Spears .......................... 285/355 |
| 2008/0185842 A1 | 8/2008 | Blackman et al. |
| 2010/0259042 A1 | 10/2010 | Spears |
| 2014/0346256 A1 | 11/2014 | Abels et al. |
| 2019/0175968 A1 | 6/2019 | Pressnell |

FOREIGN PATENT DOCUMENTS

| | | |
|---|---|---|
| EP | 0691505 A1 | 1/1996 |
| EP | 2 284 431 A1 | 2/2011 |
| JP | 2004357981 A | 12/2004 |
| RU | 108544 | 9/2011 |
| RU | 2476754 | 2/2013 |

OTHER PUBLICATIONS

European Patent Office, European Patent Application No. 17844274.5, Extended European Search Report dated May 12, 2020; 20 pages.

* cited by examiner

LOW TORQUE SPRINKLER FITTING AND METHOD OF MANUFACTURE

CROSS-REFERENCE TO RELATED APPLICATIONS

This application claims priority under 35 U.S.C. § 119(e) and the benefit of U.S. Provisional Application No. 62/378,338 entitled LOW TORQUE SPRINKLER FITTING AND METHOD OF MANUFACTURE, filed on Aug. 25, 2016, by Eldon Douglas Jackson, the entire disclosure of which is incorporated herein by reference.

BACKGROUND OF THE INVENTION

The present invention relates to a plumbing fitting and particularly one for use with a fire suppressing sprinkler system and its method of manufacture.

Installation of sprinkler heads which utilize metal threads to a typical water system employed in fire suppressing systems typically involves threading the tapered metal threaded sprinkler head into a threaded polymeric socket, in turn, bonded to a polymeric water supply line using a bonding adhesive. If over tightening of the metal sprinkler head occurs, it can result in fractured polymeric sockets for receiving the fire sprinkler head or, if under tightened, water leaks can result. These problems exist, in part, because it is desirable to have the sprinkler heads specifically aligned to present a desired sprinkling pattern or, in some installations, an aesthetically pleasing common appearance. In order to do so, typically a sprinkler head wrench is employed to prevent damage to the sprinkler head during installation and approximately 25 to 50 foot-pounds of torque is applied to install the sprinkler head. Alignment of the sprinkler heads then frequently requires additional tightening as much as a quarter turn to properly align the sprinkler heads. In horizontally extending sprinklers, it is necessary for the sprinkler head deflector to be substantially horizontal and the sprinkler head fitting square to the receiving socket. Typical seals, such as O-ring type seals, have been problematical in such installations in which under tightening can cause leaks, while overtightening in an effort to obtain a seal can result in stripping or fracturing of the receiving polymeric threads of the water supply socket.

There remains a need for an improved plumbing fitting for receiving a sprinkler head which includes a seal shape that allows a sprinkler head to be mounted to a receiving socket of a fire suppression water supply line using a lower torque to achieve a seal, thereby preventing damage to the sprinkler head while providing a watertight seal and proper alignment of the sprinkler head with respect to other sprinkler heads and/or to the water supply line.

SUMMARY OF THE INVENTION

The present invention solves this need by providing an in-molded brass fitting received by a polymeric pipe socket, which is coupled to the water supply line. In one embodiment, a plumbing fitting for installing a metal fire sprinkler head to a polymeric water supply line is provided and includes a polymeric cylindrical fitting having an outer diameter at one end for extending into a water supply line and a second end molded around a threaded brass insert. The threaded brass insert includes an internal annular sealing surface, a first external annular groove spaced from one end for receiving an O-ring seal and receiving molded material from the over-molded cylinder fitting, and a second external annular groove spaced from the first annular groove for receiving molded material from the over-molded cylindrical fitting for sealably securing the brass insert within the cylindrical fitting. It also includes an annular tapered seal positioned within the brass insert and having a annular sealing surface abutting the annular sealing surface of the brass insert.

In another embodiment, an annular seal is provided for use in sealing a fire sprinkler head to a threaded fitting coupled to a water supply. The seal includes an annular body having a central opening defined by an outwardly tapered conical wall, with the conical wall terminating in a first annular surface at one end and a second annular surface at an opposite end. The seal has an outer surface including an inwardly tapered outer conical wall extending to the one end of the seal wherein the first annular surface sealably engages a threaded fitting and the second annular surface is sealably engaged by a sprinkler head.

A further embodiment of the invention includes method of manufacturing a fitting for coupling a fire sprinkler head to a water supply line including the steps of 1) providing a generally cylindrical threaded brass insert for threadably receiving a sprinkler head; 2) forming a first inwardly extending groove on an outer surface of the insert; 3) inserting an O-ring in the inwardly extending groove; 4) providing a second inwardly extending groove in said insert which is spaced from said first groove; and 5) molding a polymeric material in the shape of a coupling for attaching a fire sprinkler head to a water supply line over the brass insert, such that the polymeric material extends into said second groove.

The brass insert in a preferred embodiment of the invention receives a unique tapered seal which seats and forms a seal between the brass insert and the sprinkler head. The seal includes an inner tapered passageway which is compressed when tightening the sprinkler head, as well as an external taper to allow the seal to conform to the insert. In one embodiment, the seal also includes an outwardly tapered entry opening for easily receiving the sprinkler head during its installation. The fittings employ one of two different brass inserts, both of which use the unique tapered seal for receiving a sprinkler head providing strength and easy coupling.

In yet another embodiment, the same unique seal is used with an entirely plastic socket using NPSH threads for receiving tapered NPT threads of a sprinkler head. In all of the embodiments, the unique tapered seal allows easy installation utilizing relatively low torque to prevent damage to the sprinkler head and eliminates use of pipe dope or other thread sealant material. The seal provides a watertight seal between a sprinkler head and receiving socket which allows easy installation of a sprinkler head and facilitates proper alignment.

These and other features, objects and advantages of the present invention will become apparent upon reading the following description thereof together with reference to the accompanying drawings.

DETAILED DESCRIPTION OF THE PREFERRED EMBODIMENT

Figure 1:
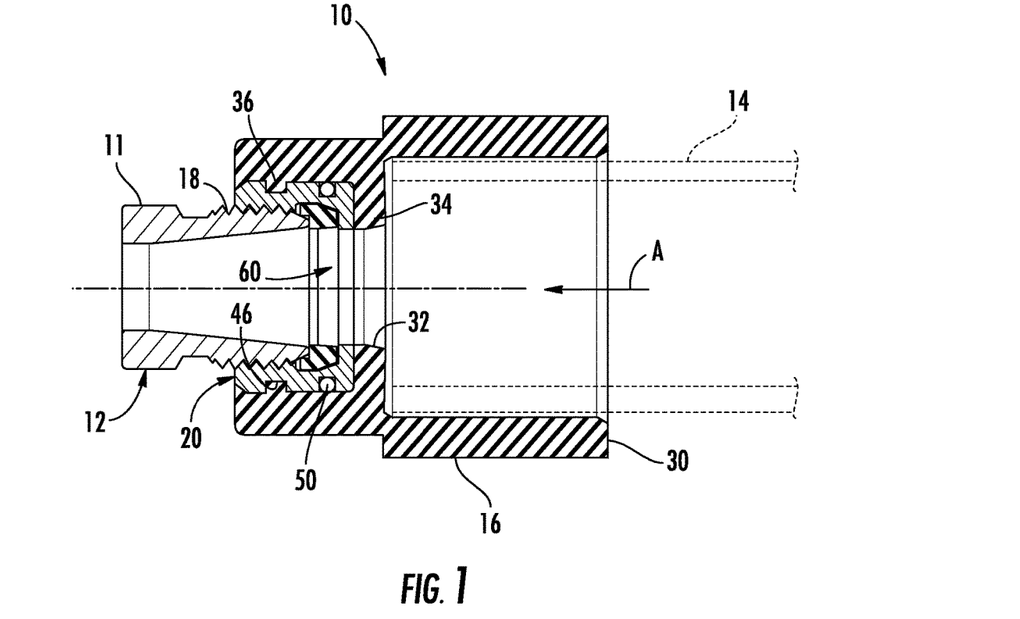
FIG. 1 is an assembled vertical cross-sectional view of a first embodiment of the fitting of the present invention.
Figure 2:
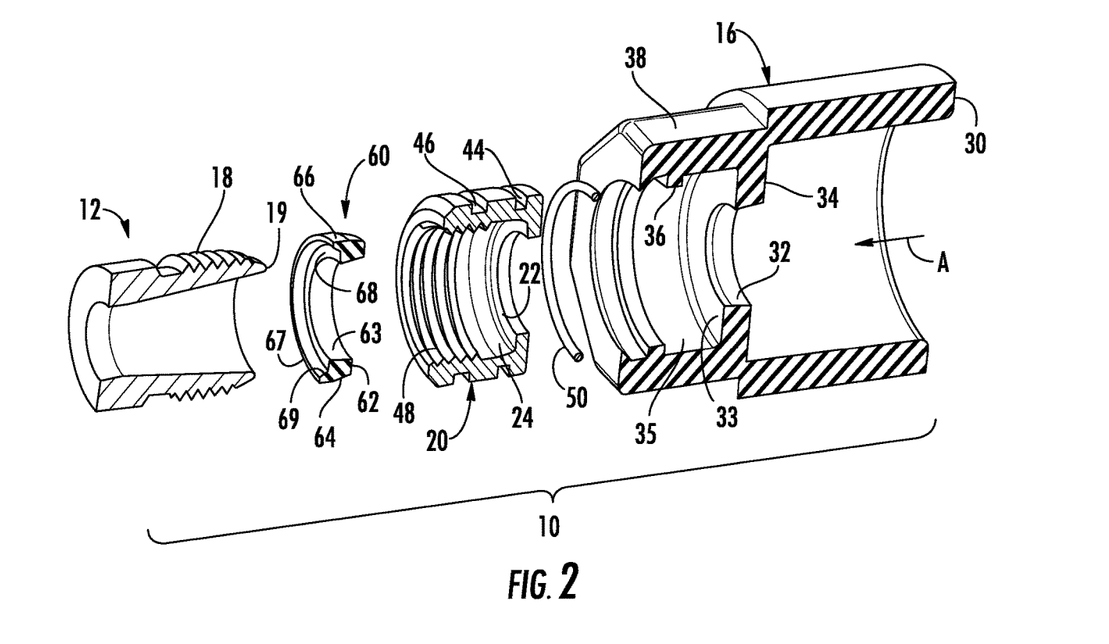
FIG. 2 is an enlarged exploded broken-away perspective view of the components of the fitting shown in FIG. 1.

Referring initially to FIGS. 1 and 2, there is shown a low torque plumbing fitting 10 for coupling a fire suppressing sprinkler head 12 to a supply conduit 14 (shown in phantom form). The supply conduit typically would be a polymeric pipe which engages and is coupled to the input end 30 of the CPVC fitting 16 utilizing conventional bonding adhesives. Depending upon a particular installation, the supply conduit may be adapted to receive a spigot-type fitting as opposed to the particular fittings 10 described in detail herein. In the drawings, only the end of the entire sprinkler head is shown, it being understood that the sprinkler head includes a deflector, a temperature fuse with a plug seal, and a pair of arms holding the deflector and fuse in spaced relationship to an end 11 of the sprinkler head. Sprinkler head end 11 accommodates a sprinkler head wrench for installing the sprinkler head 12 to the fitting 10. The head 12 typically has NPT tapered pipe threads 18 (FIG. 2) which terminate in a flat annular tip 19 that engages seal 60 as described below. In the assembly shown in FIGS. 1 and 2, the water flow is in the direction indicated by arrow A.

Figure 6:
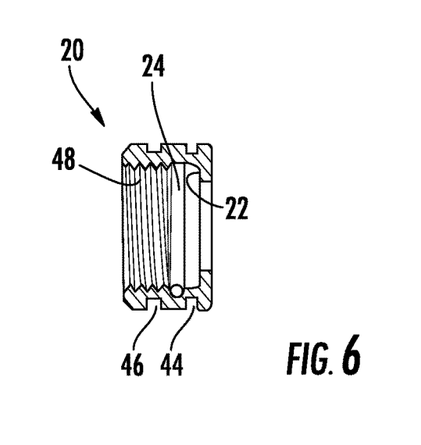
FIG. 6 is a vertical cross-sectional view of the inset shown in FIG. 5.

In the embodiment of FIGS. 1-4, a brass insert 20 is in-molded with the CPVC fitting 16 to receive the sprinkler head 12. The fitting 16 includes an open cylindrical input end 30 having an internal diameter to fit over the external diameter of the supply conduit 14 and be sealably coupled utilizing a conventional bonding sealant. The fitting 16 includes an intermediate wall 34 with an outwardly tapered (in the direction of incoming water) opening 32 surrounded at its exit side by an annular brass insert receiving seat 33 (FIG. 2). The fitting also includes an annular inwardly projecting ring 36 which is molded within an annular groove 46 of the brass insert 20, as best seen in FIGS. 1 and 6. The brass insert is in-molded within the CPVC fitting 16. The downstream end of fitting 16 includes an octagonal end 38 (FIG. 2), which allows the installer to manipulate the fitting 16 with respect to the receiving supply conduit 14 during installation to assure proper bonding between fitting 16 and conduit 14.

The low torque fitting 10 further includes a rubber O-ring 50 which fits within an inwardly projecting annular O-ring receiving groove 44 of the brass insert 20 and provides a seal between the brass insert 20 and the inner cylindrical wall 35 (FIG. 2) of the fitting 16 when the fitting 16 is molded over the combination of the brass insert 20 including the O-ring 50 prefitted within the groove 44. The brass insert 20 includes an NPSH (National Pipe Straight Hose) thread 48 of the same pitch as tapered thread 18 of the sprinkler head 12.

Figure 3:
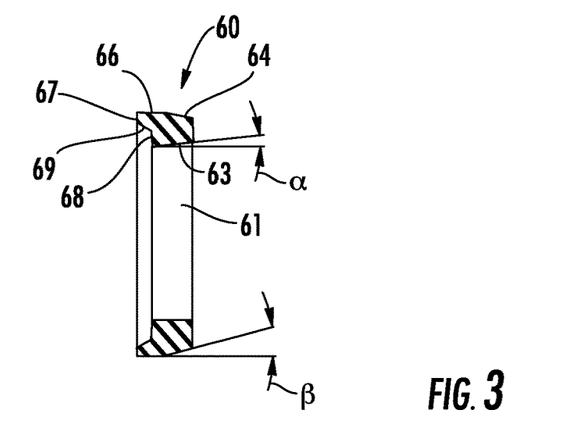
FIG. 3 is an enlarged vertical cross-sectional view of the seal shown in FIGS. 1 and 2.
Figure 4:
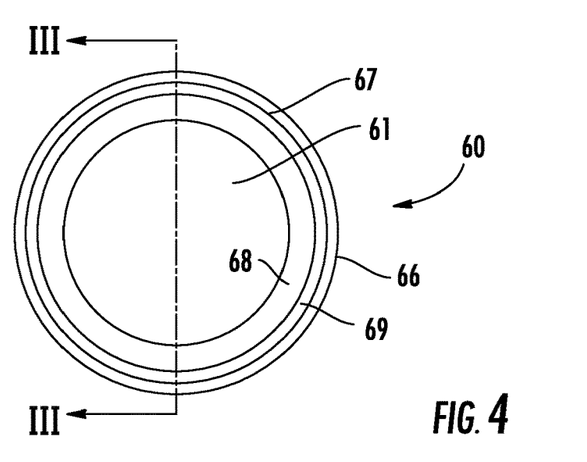
FIG. 4 is a left side elevational view of the seal, as viewed in FIG. 3.

The fitting 10 includes a uniquely shaped tapered seal 60 which, as best seen in FIGS. 2-4, is generally annular having an annular face surface 62 which abuts against and forms a seal against the annular surface 22 of brass insert 20 under the compression of sprinkler head 12 when installed. The annular seal 60 includes a cylindrical water flow opening 61. The opening 61 has a slightly conical or tapered wall 63 which is tapered outwardly (facing arrow A) at an angle α from about 5° to 7° and preferably at about 6° to allow compression of the seal 60 when sprinkler head 12 is installed without restricting water flow through opening 61. The outside diameter of the water inlet end of seal 60 includes an inwardly tapered edge 64, which is tapered at an angle β of from 13° to 17° and preferably about 15° to allow easy insertion of the seal into the brass insert 20 and which mateably engages the tapered surface 24 (FIG. 2) of the brass insert to assist in allowing the gasket into sealing engagement with the surface 22 of insert 20 during installation of the sprinkler head 12. The discharge end of seal 60 includes a cylindrical outer wall 66 with an outer annular end surface 67. An annular sealing surface 68 engages the annular tip 19 of sprinkler head 12 to seal the connection between sprinkler head 12 and low torque fitting 10. Seal 60 includes a transition wall 69 between sealing surface 68 and end 67 is tapered outwardly at an angle of about 60° to allow easy insertion of the tip 19 of the sprinkler head into the seal 60 without damaging the seal.

Figure 5:
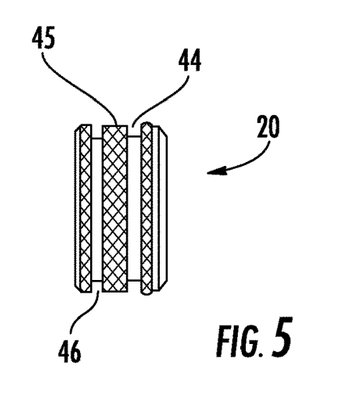
FIG. 5 is a side elevational view of the brass insert shown in FIGS. 1-2.

The brass insert is shown in detail in FIGS. 5 and 6. In addition to the O-ring receiving groove 44 and groove 46 which mates with the molded fitting 16, it includes a knurled outer surface 45 which assures that the brass insert 20 is securely in-molded within fitting 16 during the molding process described below.

The sprinkler head 12 is threaded into fitting 10 after the input end 30 of fitting 16 has been bonded to supply line 14. As the head 12 is installed, the seal 60 deforms somewhat, as seen in FIG. 1, to provide a leak-proof seal between the sprinkler head 12 and the fitting 10 requiring only between 5 to 60 inch-pounds of torque as opposed to the usual 25 to 50 foot-pounds torque necessary in typical sprinkler head installations. The geometry of the seal 60, as described above, is such that this can be achieved without restricting the flow of water through opening 61 in the seal while maintaining a watertight seal between the sprinkler head 12 and the fitting 10. The unique geometry of seal 60 allows the low torque mounting of the sprinkler head and its rotation in the receiving fitting to a desired alignment.

The sprinkler head is installed in fitting 10 without the use of any sealant, which is unnecessary. The sprinkler head 12 is first threadably inserted by hand until contact with gasket seal 60 is felt. Next, using a sprinkler head wrench, the sprinkler head 12 is rotated clockwise (to tighten) a minimum of ¼ turn (90°). In order to properly align the sprinkler head for a desired spray pattern or to align horizontally, or with other heads in some installations, the seal 60 allows the sprinkler head to be further rotated up to 360° or one full turn. Thus, the geometry of seal 60 allows the sprinkler head to be properly aligned without damage to either the sprinkler head or the receiving fitting 10, while at the same time providing a watertight seal using a relatively low torque for installation. If necessary, during the lifetime of an installation it becomes necessary to replace the seal 60 it can removed and replaced with a new seal.

The steps of manufacturing the fitting 10 include (1) placing O-ring 50 in groove 44 of brass insert 20; (2) positioning insert 20 in a mold concentric with the mold walls defining the CPVC fitting 16; (3) over-molding the brass insert 20 and O-ring 50 with CPVC or other suitable polymeric material; (4) removing the fitting 16 with the sealed brass insert from the mold; and (5) inserting the annular seal 60 into the fitting 10 with surface 62 abutting annular surface 22 of the brass insert 20 in the CPVC fitting 16.

Figure 7:
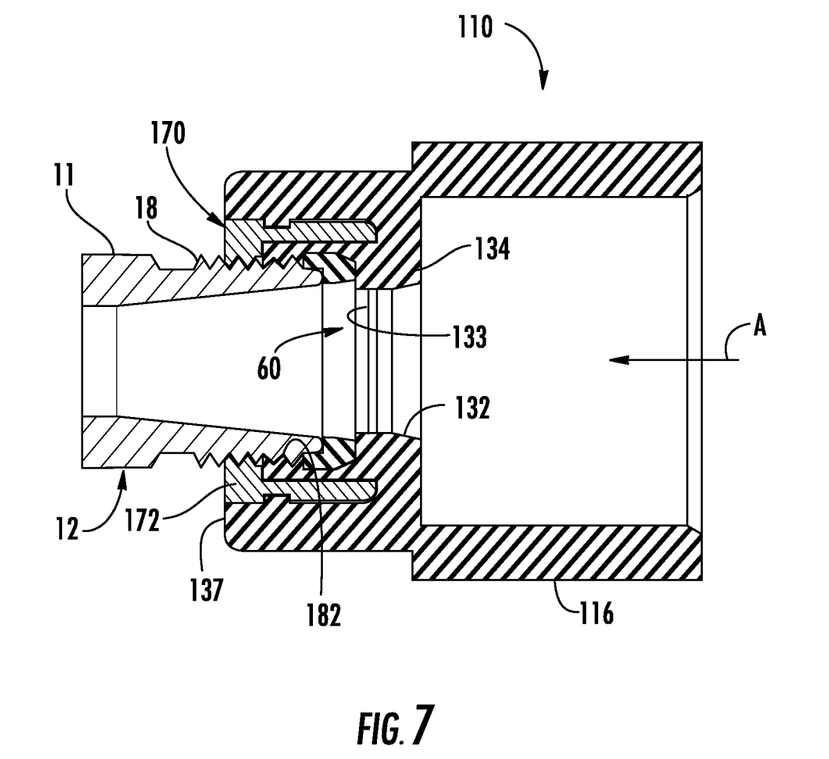
FIG. 7 is an assembled vertical cross-sectional view of an alternative embodiment of the present invention utilizing a different brass insert.
Figure 8:
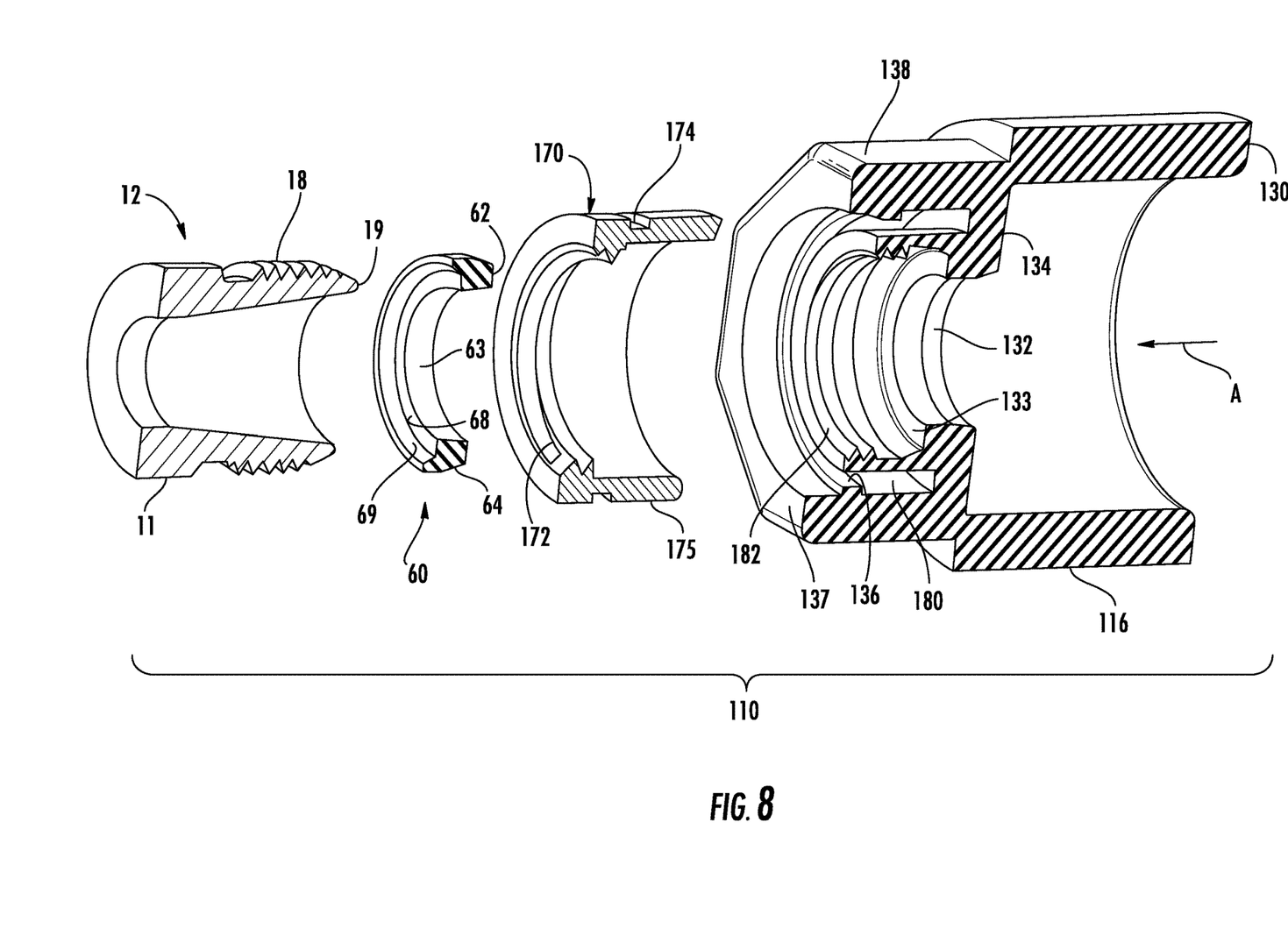
FIG. 8 is an enlarged exploded broken-away perspective view of the components of the assembly shown in FIG. 7.

Turning now to FIGS. 7-10, an alternative embodiment of the invention is shown in which a differently configured brass insert 170 is employed with the CPVC plastic body 116. FIGS. 7 and 8 show the same sprinkler head 12 with NPT tapered threads 18 with an end 19 that seals against surface 68 of the same seal 60 as described in the first embodiment. The CPVC fitting 116 includes similar components as fitting 16, which are identified by the same last two digits. The difference between the first embodiment and the second embodiment shown in FIGS. 7-10 is that the brass insert 170 includes only lead-in brass threads 172 (FIG. 8), which extend to the outer edge of the input end 137 of CPVC fitting 116, as best seen in FIG. 7. The brass insert 170 includes an inwardly extending annular groove 174 (FIG. 8) which receives an inwardly extending molded annular rib 136 of fitting 116 during the molding of the fitting 116 over insert 170. The brass insert 170 has a collar 175 received in an in-molded cylindrical slot 180 of fitting 116. Fitting 116 includes axially spaced polymeric threads 182 aligned with and matching the threads 172 of the brass insert 170 and positioned immediately adjacent threads 172 and upstream of the flow of the water indicated by arrow A in FIGS. 7 and 8.

Figure 9:
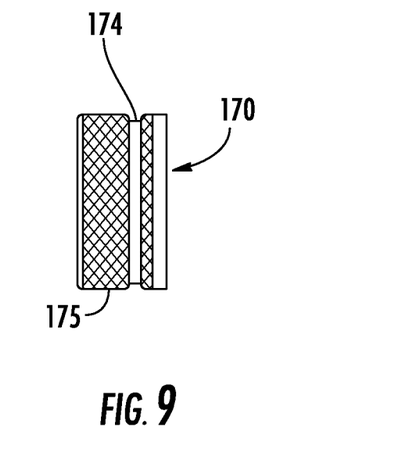
FIG. 9 is a side elevational view of the brass insert shown in FIG. 8.
Figure 10:
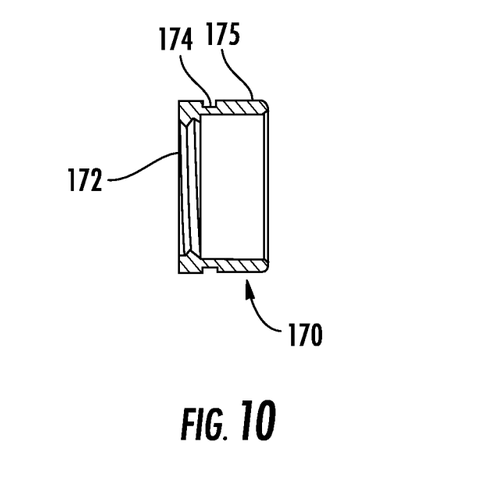
FIG. 10 is a vertical cross-sectional view of the brass insert shown in FIG. 8.

The cylindrical collar 175 of insert 170 provides backing reinforcement for the polymeric threads 182 and, therefore, strengthens the fitting 116. In this embodiment, the seating surface 62 of the seal (FIG. 3) engages directly against the polymeric annular surface 133 (FIG. 7) of fitting 116. Insert 170, as seen in FIGS. 9 and 10, also has a knurled outer surface 175 to assure its secure in-molding within CPVC fitting 116. The process of manufacturing the fitting, including the positioning of the brass insert 170 in the mold and subsequently over-molding fitting 116 over the brass insert is the same as in the first embodiment, as is the subsequent insertion of seal 60 within the fitting 116, resulting in the finished fitting 110. As in the first embodiment, the threads of the sprinkler head 12 are tapered NPT threads while the threads 172 and 182 of the brass insert 170 and polymeric fitting 116 are straight NPSH threads having the same pitch as the threads of the sprinkler head. Installation of the sprinkler head 11 is the same as described above.

Figure 11:
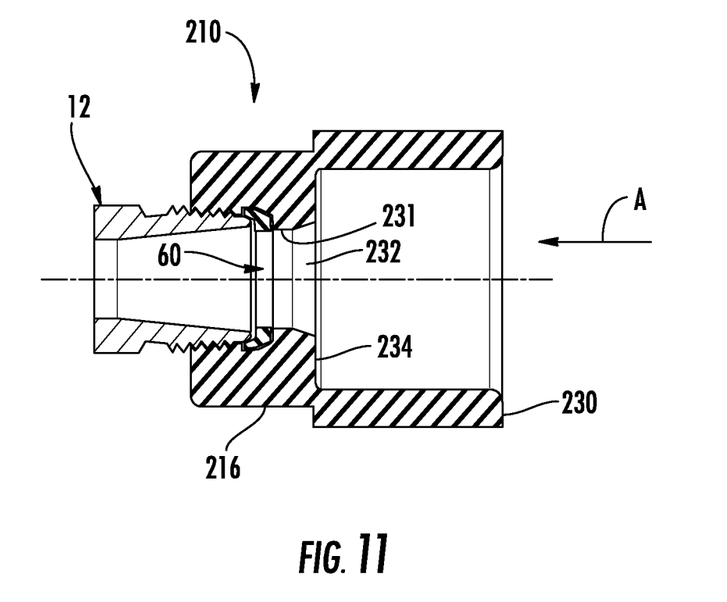
FIG. 11 is a vertical cross-sectional assembled view of a polymeric socket for receiving a sprinkler head.
Figure 12:
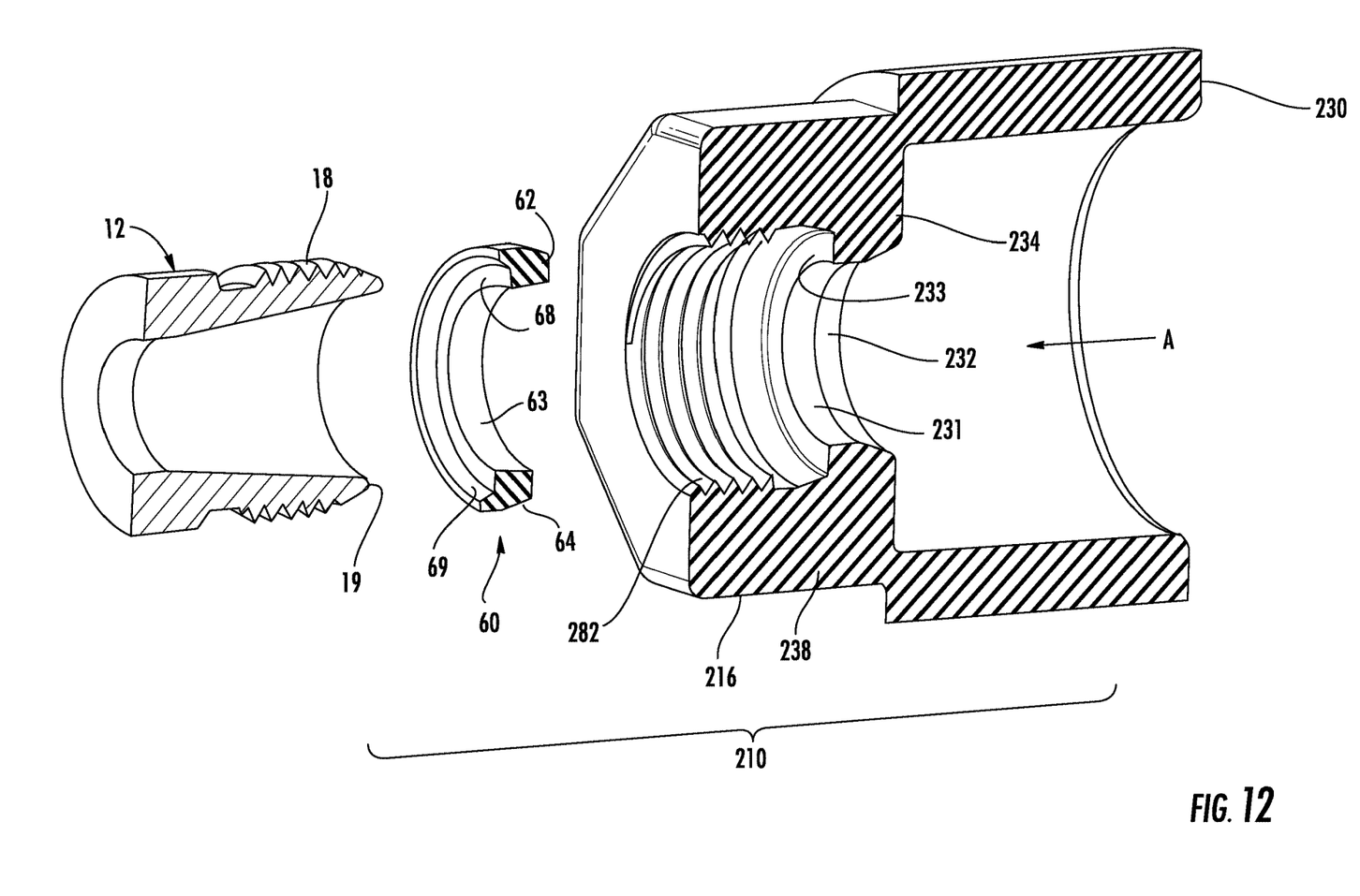
FIG. 12 is an enlarged exploded broken-away perspective view of the assembly shown in FIG. 11.

In a third embodiment of the invention shown in FIGS. 11 and 12, an all plastic plumbing fitting 210 is provided and includes a molded plastic CPVC body 216. The same seal 60 is employed as in the first two embodiments shown in FIGS. 3 and 4, as well as the same sprinkler head 12, having tapered NPT threads 18 and a tip 19, which seats and seals against the surface 68 of the seal 60. In this embodiment, elements similar to those in the first two embodiments employ the same last two digits in the reference numerals.

CPVC body 216 has a cylindrical input end 230 with a wall thickness of about 0.22 inches which is sealed to a supply conduit 14 (FIG. 1), as in the earlier embodiments, utilizing a conventional bonding adhesive. The body includes a wall 234 with a conically inwardly tapered opening 232 and a sealing surface 233 (FIG. 12) against which the sealing surface 62 of seal 60 abuts and forms a seal when compressed by attaching the sprinkler head 12. A cylindrical transition wall 231 extends between the conical opening 232 and the annular sealing surface 233 to provide a transition between the water flow opening defined by conical opening 232 and cylindrical wall 231. In this embodiment, the threaded end 238 of body 216 includes straight NPSH threads 282 and is somewhat thicker with a wall thickness of about 0.33 inches, which is about 50% thicker than the corresponding section of the polymeric fittings of the prior embodiments to provide the strength desired for threaded CPVC body 216. These dimensions are for a ½ inch pipe, it being understood that the dimensions will be proportionally changed for larger fittings, and the dimensions may vary within a reasonable tolerance range normally encountered in plumbing fittings. Fitting 210 is manufactured utilizing the steps of molding the CPVC body 216, including threads 282 (FIG. 12) for receiving sprinkler head 12, wall 231, conical opening 232, and sealing surface 233 as one integral piece, including body 216 and input end 230, and subsequently inserting seal 60 against and in abutting relationship to sealing surface 233. The sprinkler head 12 is then threaded into the straight threads 282 of body 216 until seal 60 is compressed to provide a sealed interface between sprinkler head 12 and fitting 210. The final sprinkler head alignment is achieved as done in the previous embodiments described above.

In each of the three embodiments, the same seal 60 is employed and its multiple tapered configuration is critical to the success of all three embodiments in providing a low torque, leak-proof connection between the sprinkler head and the socket defined by the receiving fittings 16, 116, and 216. Critical elements of the seal geometry include the conical wall 63 in the center of the seal, the inwardly tapered outer edge 64 of the seal, and the annular seat 68 with tapered inlet transition wall 69 allowing the sprinkler head to be easily inserted and compress the seal 60 without damage to the seal and without interfering with the flow of water through the center aperture 61 of the seal. The material employed for seal 60 is an EPDM material having a durometer hardness of from 65 to 80, and preferably 70, to provide the desired sealing function and maintain sprinkler head position. This connection style fitting can also be incorporated in other various fitting styles, such as 90° elbows, T's and crosses, which accept direct connection of fire sprinkler heads.

It will become apparent to those skilled in the art that various modifications to the preferred embodiments of the invention as described herein can be made without departing from the spirit or scope of the invention as defined by the appended claims.

The invention claimed is:

1. A plumbing fitting for installing a fire sprinkler head to a water supply line comprising:
   a polymeric cylindrical fitting having an outer diameter at one end for coupling to a water supply line and a second end molded around a threaded brass insert, said threaded brass insert including an annular sealing surface, said brass insert further including a first annular groove spaced from one end for receiving an O-ring seal and a second annular groove spaced from said first annular groove for receiving molded material from said cylindrical fitting for sealably securing said brass insert within said cylindrical fitting; and
   an annular seal positioned within said brass insert and having a annular sealing surface abutting said annular sealing surface of said brass insert.

2. The fitting as defined in claim 1 wherein said annular seal comprises an annular body having a central opening with an outwardly tapered conical wall, said conical wall terminating in a first annular surface at one end and a second annular surface at an opposite end; and said seal has an outer surface including an inwardly tapered outer conical wall extending to said one end of said seal wherein said first annular surface sealably engages said annular sealing surface of said polymeric fitting and said second annular surface is sealably engaged by a sprinkler head.

3. The fitting as defined in claim 2 wherein said conical wall of said central opening is tapered outwardly toward the water supply at an angle of from 5°-7°.

4. The fitting as defined in claim 3 wherein said outer surface of said seal is tapered inwardly toward the water supply at an angle of from 13°-17°.

5. The fitting as defined in claim 4 wherein said seal further includes a conical transition wall extending divergently outwardly from said second annular surface.

6. A plumbing fitting for installing a fire sprinkler head to a water supply line, said fitting comprising:

a body having a first end for coupling to a water supply line and a second end having internal threads for threadably receiving a fire sprinkler head, said body further including an annular sealing surface at the end of said threads; and an annular seal including an annular body having a central opening with an outwardly tapered conical wall, said conical wall terminating in a first annular surface at one end and a second annular surface at an opposite end; and said seal having an outer surface including an inwardly tapered outer conical wall extending to said one end of said seal wherein said first annular surface is adapted to sealably engage the annular sealing surface of the body and said second annular surface is adapted to be sealably engaged by a sprinkler head.

7. The seal as defined in claim 6 wherein said conical wall of said central opening is tapered outwardly toward the water supply at an angle of from 5°-7°.

8. The seal as defined in claim 6 wherein said outer surface of said seal is tapered inwardly toward the water supply at an angle of from 13°-17°.

9. The fitting as defined in claim 6 wherein said seal further includes a conical transition wall extending divergently outwardly from said second annular surface at an angle of about 60°.

10. The fitting as defined in claim 6 wherein the body comprises a ploymeric cylindrical body having the first end for coupling to a water supply line and the second end having internal threads for threadably receiving a fire sprinkler head.

11. The fitting as defined in claim 10 wherein said body has a tapered central opening positioned between said first end and said internal threads.

12. The fitting as defined in claim 11 wherein said conical wall of said central opening of said seal is tapered outwardly toward the water supply at an angle of from 5°-7°.

13. The fitting as defined in claim 12 wherein said outer surface of said seal is tapered inwardly toward the water supply at an angle of from 13°-17°.

14. The fitting as defined in claim 13 wherein said seal further includes a conical transition wall extending divergently outwardly from said second annular surface at an angle of about 60°.

15. The fitting as defined in claim 6 wherein said body comprises a polymeric cylindrical fitting having said first end for coupling to a water supply line and said second end molded around a brass insert.

16. The fitting as defined in claim 15 wherein said brass insert includes an annular groove for receiving molded material from said cylindrical fitting for securing said brass insert within said cylindrical fitting.

17. The fitting as defined in claim 15 wherein said brass insert includes said internal threads and said annular sealing surface and said brass insert includes a first annular groove spaced from one end for receiving an O-ring seal and a second annular groove spaced from said first annular groove for receiving molded material from said cylindrical fitting for securing said brass insert within said cylindrical fitting.

18. The fitting as defined in claim 17 wherein said polymeric cylindrical fitting has a tapered central opening positioned between said first end and said internal threads.

19. The fitting as defined in claim 17 wherein said conical wall of said central opening is tapered outwardly toward the water supply at an angle of from 5° -7° , and wherein said outer surface of said seal is tapered inwardly toward the water supply at an angle of from 13°-17°.

20. The fitting as defined in claim 17 wherein said seal further includes a conical transition wall extending divergently outwardly from said second annular surface.

21. The fitting as defined in claim 15 wherein the polymeric cylindrical fitting includes said internal threads and wherein said brass insert including a cylindrical collar and lead-in threads at said second end for the fire sprinkler head, the lead-in threads being aligned with said internal threads of said polymeric fitting, said collar of said brass insert surrounding and spaced from said internal threads of said polymeric fitting.

22. The fitting as defined in claim 21 wherein said polymeric cylindrical fitting has a tapered central opening positioned between said first end and said internal threads.

23. The fitting as defined in claim 21 wherein said conical wall of said central opening is tapered outwardly toward the water supply at an angle of from of from 5° -7° , and wherein said outer surface of said seal is tapered inwardly toward the water supply at an angle of from 13°-17°.

24. The fitting as defined in claim 21 wherein said seal further includes a conical transition wall extending divergently outwardly from said second annular surface.

25. A fitting for installing a fire sprinkler head to a water supply line comprising:

a polymeric cylindrical fitting having an outer diameter at one end for coupling to a water supply line and a second end molded around a threaded brass insert, said threaded brass insert including an annular sealing surface, said brass insert further including a first annular groove spaced from one end for receiving an 0-ring seal and a second annular groove spaced from said first annular groove for receiving molded material from said cylindrical fitting for sealably securing said brass insert within said cylindrical fitting, and an annular seal positioned within said brass insert and having a first annular sealing surface abutting said annular sealing surface of said brass insert;

wherein said annular seal comprises an annular body having a central opening with an outwardly tapered conical wall, said conical wall terminating in the first annular surface at one end and a second annular surface at an opposite end; and said seal has an outer surface including an inwardly tapered outer conical wall extending to said one end of said seal wherein said first annular surface sealably engages said annular sealing surface of said polymeric fitting and said second annular surface is sealably engaged by a sprinkler head.

26. The fitting as defined in claim 25 wherein said conical wall of said central opening is tapered outwardly toward the water supply at an angle of from 5°-7°.

27. The fitting as defined in claim 26 wherein said outer surface of said seal is tapered inwardly toward the water supply at an angle of from 13°-17°.

28. The fitting as defined in claim 27 wherein said seal further includes a conical transition wall extending divergently outwardly from said second annular surface at an angle of about 60°.

29. An annular seal for sealing a fire sprinkler head to a threaded fitting coupled to a water supply, said seal comprising:
   a first terminal end having a first annular surface disposed about a central axis of the seal, the first annular surface adapted to sealably engage a sealing surface of a threaded fitting,
   a second terminal end disposed along the central axis and disposed about the central axis,
   an outer surface having a cylindrical outer wall adjacent the second terminal end and an inwardly tapered outer conical wall extending to the first annular surface; and
   an inner surface having a second annular surface disposed between the first annular surface and the second terminal end, the second annular surface adapted to be sealably engaged by a sprinkler head; a conical wall that tapers outwardly from the second annular surface and terminates at the first annular surface defining a central opening, and a transition wall that tapers outwardly from the second annular surface and terminates at the second terminal end,
   wherein each of the first annular surface and the second annular surface comprise a generally planar surface disposed generally perpendicular to the central axis of the seal.

* * * * *

UNITED STATES PATENT AND TRADEMARK OFFICE
CERTIFICATE OF CORRECTION

PATENT NO. : 10,744,527 B2
APPLICATION NO. : 15/664311
DATED : August 18, 2020
INVENTOR(S) : Eldon Douglas Jackson Page 1 of 1

It is certified that error appears in the above-identified patent and that said Letters Patent is hereby corrected as shown below:

In the Claims

Column 6, Line numbers 60 and 61, In Claim 1, after "O-ring seal" delete "and".

Column 6, Line numbers 60 and 61, In Claim 1, after "O-ring seal" insert --,--.

Column 6, Line number 63, In Claim 1, after "cylindrical fitting" insert --, and a surface disposed between the first annular groove and the second annular groove configured to fixedly sealably secure--.

Column 6, Line number 63, In Claim 1, after "cylindrical fitting" delete "for sealably securing".

Column 6, Line number 66, In Claim 1, after "having" delete "a" and insert --an--.

Column 7, Line number 38, In Claim 7, after "The" delete "seal" and insert --fitting--.

Column 7, Line number 41, In Claim 8, after "The" delete "seal" and insert --fitting--.

Signed and Sealed this
Thirteenth Day of October, 2020

Andrei Iancu
*Director of the United States Patent and Trademark Office*